United States Patent
Kim et al.

(10) Patent No.: US 12,309,503 B2
(45) Date of Patent: May 20, 2025

(54) INTERMEDIATE COLOR FORMAT FOR IMAGE PROCESSING

(71) Applicant: QUALCOMM Incorporated, San Diego, CA (US)

(72) Inventors: Hyung Cook Kim, San Diego, CA (US); Xiaoyun Jiang, San Diego, CA (US); Yunqiang Chen, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 76 days.

(21) Appl. No.: 18/455,473

(22) Filed: Aug. 24, 2023

(65) Prior Publication Data

US 2025/0071434 A1    Feb. 27, 2025

(51) Int. Cl.
*H04N 23/84*      (2023.01)
*G06T 3/14*       (2024.01)
*G06T 3/18*       (2024.01)
*H04N 23/741*     (2023.01)

(52) U.S. Cl.
CPC ............ *H04N 23/843* (2023.01); *G06T 3/14* (2024.01); *G06T 3/18* (2024.01); *H04N 23/741* (2023.01)

(58) Field of Classification Search
CPC ...... H04N 23/843; H04N 23/741; G06T 3/14; G06T 3/18
See application file for complete search history.

(56) References Cited

U.S. PATENT DOCUMENTS

| | | |
|---|---|---|
| 8,014,597 B1 | 9/2011 | Newman |
| 8,508,621 B2 | 8/2013 | Côté et al. |
| 8,611,652 B2 | 12/2013 | Jannard et al. |
| 8,948,248 B2 | 2/2015 | Rossato et al. |
| 9,210,391 B1 | 12/2015 | Mills |

(Continued)

FOREIGN PATENT DOCUMENTS

EP    4171005 A1    4/2023

OTHER PUBLICATIONS

Hua L., et al., "A Color Interpolation Algorithm for Bayer Pattern Digital Cameras Based on Green Components and Color Difference Space", 2010 IEEE International Conference on Progress in Informatics and Computing, Dec. 10-12, 2010, pp. 791-795.

(Continued)

*Primary Examiner* — Mekonnen D Dagnew
(74) *Attorney, Agent, or Firm* — Shumaker & Sieffert, P.A.

(57) ABSTRACT

An apparatus for image processing includes one or more processors configured to receive first image data in a first color format that includes a plurality of color planes at a reduced resolution relative to a full resolution, generate second image data in an intermediate color format based on the first image data in the first color format, the intermediate color format includes a first color plane at an increased resolution and at least one of the plurality of color planes at the reduced resolution, store, in the one or more external memories, the second image data, perform image processing based on accessing the second image data, and generate third image data based on the image processing, the third image data is in a third color format that includes the plurality of color planes at a same resolution.

25 Claims, 4 Drawing Sheets

(56) References Cited

U.S. PATENT DOCUMENTS

| | | |
|---|---|---|
| 11,341,623 B2 | 5/2022 | Guerin et al. |
| 2008/0030596 A1 | 2/2008 | Sung et al. |
| 2008/0088711 A1* | 4/2008 | Border ................... H04N 23/68 |
| | | 348/222.1 |
| 2015/0109495 A1* | 4/2015 | Tanaka ................. H04N 25/135 |
| | | 348/277 |
| 2018/0040104 A1* | 2/2018 | Lukac ..................... G06T 11/60 |
| 2022/0198623 A1* | 6/2022 | Tsai ..................... H04N 23/741 |
| 2023/0254593 A1 | 8/2023 | Vacquerie |

OTHER PUBLICATIONS

International Search Report and Written Opinion—PCT/US2024/041778—ISA/EPO—Nov. 29, 2024, 11 pages.

* cited by examiner

FIG. 3

COLOR FORMAT SAMPLES 304

INTERMEDIATE COLOR FORMAT SAMPLES 302

BAYER FORMAT SAMPLES 300

INTERMEDIATE COLOR FORMAT FOR IMAGE PROCESSING

TECHNICAL FIELD

This disclosure relates to image processing.

BACKGROUND

A digital camera includes an image sensor with a plurality of photodetectors. The digital camera may also include a Bayer filter placed over the photodetectors. The Bayer filter is configured to pass through one of the primary colors (e.g., one of red (R), green (G), or blue (B)) of light. That is, each photodetector receives one of the primary colors of the light. The output from the Bayer filter may be referred to as a Bayer pattern image, or Bayer format samples. In the Bayer format, each of the colors may be associated with a color plane (e.g., red plane, green plane, and blue plane). The color planes are at a reduced resolution compared to a full resolution of the image frame. That is, in the Bayer format, there may not be a R, G, or B color value for all samples in the image frame.

A camera processor, through a process referred to as demosaicing, reconstructs full resolution color planes (e.g., full resolution red plane (R plane), full resolution green plane (G plane), and full resolution blue plane (B plane)). The camera processor then performs additional processing on the R plane, G plane, and B plane (collectively referred to as RGB planes) to generate image content for display. As one example, the camera processor may perform warping or scaling using the RGB planes. As another example, the camera processor may convert the RGB planes into other planes, like YUV planes (e.g., after downsampling), perform the warping or scaling on the YUV planes, and then reconvert the warped and/or scaled YUV planes into RGB planes to generate image content for display.

SUMMARY

In general, this disclosure describes techniques for performing processing of an image frame in an intermediate color format, rather than generating an image frame in a full color format for processing. For instance, this disclosure describes example techniques of using an intermediate color format that is intermediate to the Bayer format and the RGB color format for performing image processing. The RGB color format refers to having a full resolution red plane (R plane), a green plane (G plane), and blue plane (B plane). In the Bayer format, the R plane, G plane, and the B plane may be at a reduced resolution. In the intermediate color format, at least one of the color planes may be at full resolution, while at least one of the other color planes is at a reduced resolution (e.g., all other planes are at the reduced resolution).

To generate the intermediate color format from the Bayer format, as one example, the camera processor may interpolate color samples of one color (e.g., G) of the plurality of colors (e.g., RGB) to generate a first color plane at the full resolution (e.g., full resolution green plane), and keep the color planes for the other colors are the reduced resolution (e.g., reduced resolution red and blue planes). As an example, in the intermediate color format, there is a full resolution green plane, a reduced resolution red plane, and a reduced resolution blue plane.

The camera processor may store the intermediate color format to external memory (e.g., external to the circuitry that includes the camera processors or external to the integrated circuit (IC) chip that includes the camera processor), and then access the intermediate color format to perform image processing, like warping and scaling. For instance, rather than first reconstructing full resolution RGB planes, and then perform warping and scaling, the example techniques perform warping and scaling on the intermediate color format, which reduces processing time and the number of color format changes that may be needed. The camera processor may then convert the processed color planes into full resolution RGB planes for display. By performing image processing in the intermediate color format, rather than first reconstructing to full resolution RGB planes and then performing image processing, the example techniques may improve the operation of a camera processor such as requiring fewer operations, while maintaining image quality.

In one example, the disclosure describes a method of image processing, the method comprising: receiving, with one or more processors, first image data in a first color format that includes a plurality of color planes at a reduced resolution relative to a full resolution, the full resolution being equal to a resolution of image content output from an image sensor of a camera; generating, with the one or more processors, second image data in an intermediate color format based on the first image data in the first color format, the intermediate color format includes a first color plane at an increased resolution relative to the reduced resolution and at least one of the plurality of color planes at the reduced resolution; storing, in one or more external memories external to the one or more processors, the second image data; performing, with the one or more processors, image processing based on accessing the second image data from the one or more external memories; and generating third image data based on the image processing, the third image data is in a third color format that includes the plurality of color planes at a same resolution.

In one example, the disclosure describes an apparatus for image processing, the apparatus comprising: one or more external memories external to an integrated circuit (IC) chip that includes one or more processors; and the one or more processors implemented in circuitry, coupled to the one or more external memories, and configured to: receive first image data in a first color format that includes a plurality of color planes at a reduced resolution relative to a full resolution, the full resolution being equal to a resolution of image content output from an image sensor of a camera; generate second image data in an intermediate color format based on the first image data in the first color format, the intermediate color format includes a first color plane at an increased resolution relative to the reduced resolution and at least one of the plurality of color planes at the reduced resolution; store, in the one or more external memories external to the one or more processors, the second image data; perform image processing based on accessing the second image data from the one or more external memories; and generate third image data based on the image processing, the third image data is in a third color format that includes the plurality of color planes at a same resolution.

In one example, the disclosure describes a computer-readable storage medium storing instructions thereon that when executed cause one or more processors to: receive first image data in a first color format that includes a plurality of color planes at a reduced resolution relative to a full resolution, the full resolution being equal to a resolution of image content output from an image sensor of a camera; generate second image data in an intermediate color format based on the first image data in the first color format, the intermediate color format includes a first color plane at an increased resolution relative to the reduced resolution and at least one of the plurality of color planes at the reduced resolution; store, in one or more external memories external to the one or more processors, the second image data; perform image processing based on accessing the second image data from the one or more external memories; and generate third image data based on the image processing, the third image data is in a third color format that includes the plurality of color planes at a same resolution.

The details of one or more examples are set forth in the accompanying drawings and the description below. Other features, objects, and advantages will be apparent from the description, drawings, and claims.

BRIEF DESCRIPTION OF DRAWINGS

FIG. 3 is a conceptual diagram illustrating examples of samples in different formats as generated by the camera and the camera processor according to the techniques of this disclosure.

DETAILED DESCRIPTION

Figure 1:
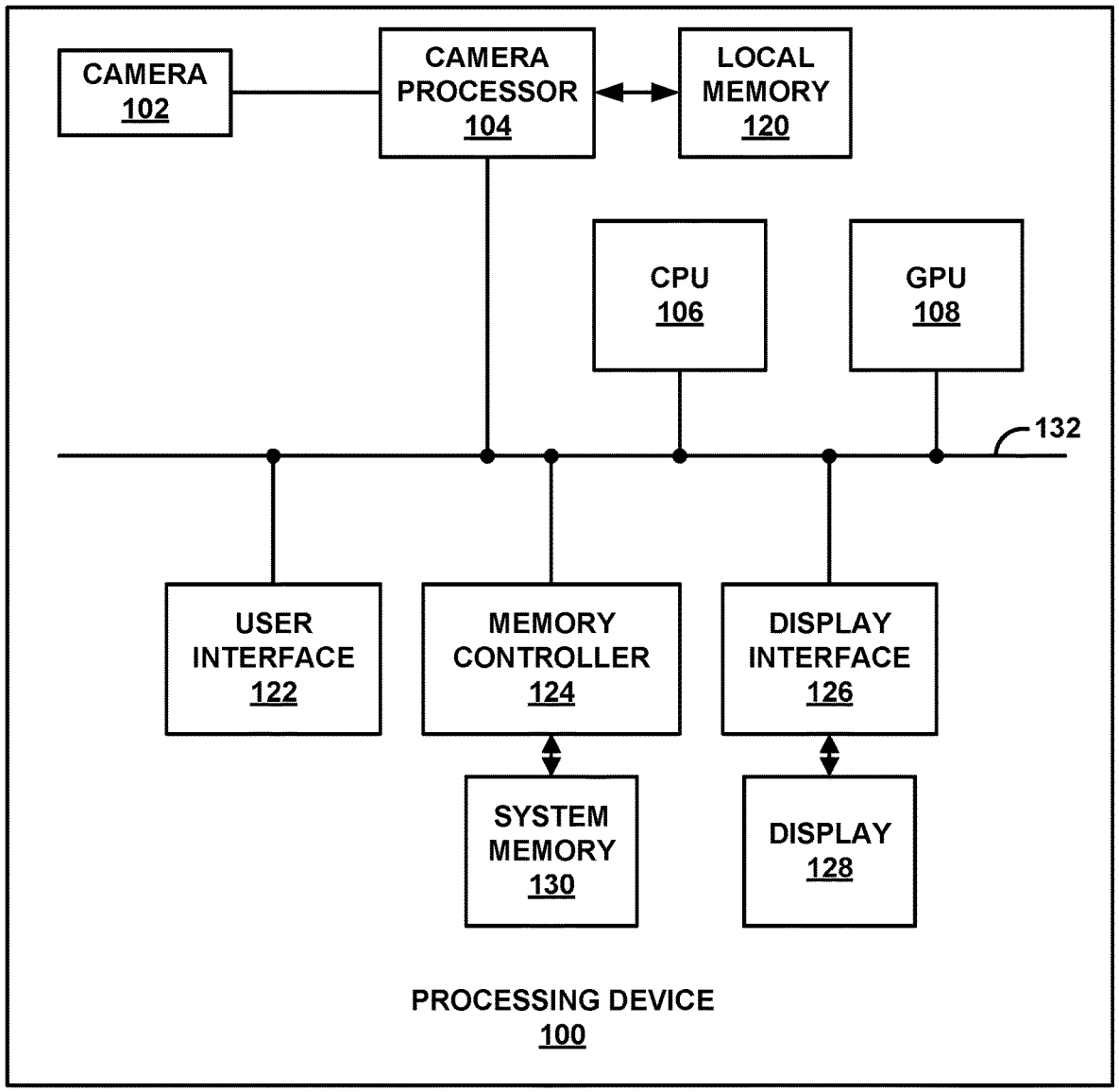
FIG. 1 is a block diagram of a device configured to perform operations in an intermediate color format according to the techniques of this disclosure.

A camera includes a lens and an image sensor, and the image senor includes plurality of photodetectors arranged as a grid. A filter, such as a Bayer filter, is coupled to the photodetectors such that each photodetector receives light for one color component. For example, the Bayer filter is a 2×2 grid that includes two green filters, one red filter, and one blue filter. This 2×2 grid is copied across the grid of photodetectors. Without the Bayer filter, each photodetector may output information indicative of the luminance (e.g., brightness) of the received light, in which case color information is lost. With a Bayer filter, each photodetector receives light with one color component (e.g., green, red, or blue). That is, for the photodetectors coupled to the green filter, these photodetectors receive the green component of the light, and output a sample value indicative of the green component. Similarly, for the photodetectors coupled to the red or blue filter, these photodetectors receive the red or blue component of the light, and output sample values indicative of the red or blue component, respectively.

The image data for the photodetectors may be considered to be in the Bayer color format. For example, the output from each of the photodetectors may contribute to one of a plurality of color planes. For instance, the photodetectors coupled to green filters output sample values for samples that form a green color plane, the photodetectors coupled to red filters output sample values for samples that form a red color plane, and the photodetectors coupled to the blue filters output sample values for samples that form a blue color plane. In this example, each of the red, green, and blue color planes may be considered as being at a reduced resolution relative to a full resolution.

The full resolution may be equal to a resolution of image content output from the image sensor. As one example, a full resolution may be equal to a size of the grid of photodetectors in an image sensor of the camera. As another example, the image sensor may be configured to perform "binning" in which the image sensor performs blending (e.g., averaging) of neighboring pixels. For instance, there may be 48 million (mega) photodetectors in an image sensor, and the image sensor averages outputs for every four photodetectors to generate a 12 megapixel resolution image. In some examples, the full resolution may be the resolution (e.g., size) of image content output from the image sensor (e.g., 12 megapixel). Accordingly, the full resolution may be equal to a resolution of image content output from the image sensor. In some examples, the size of the grid of photodetectors may be equal to the resolution of image content output from the image sensor. In examples where binning is performed, the resolution of image content output from the image sensor may be less than the size of the grid of photodetectors, where the size of the grid of photodetectors is an integer multiple of the resolution of the image content output from the image sensor.

Each of the color planes may be in a reduced resolution because the color planes may not include a sample value for each of the photodetectors in the grid of photodetectors. In other words, the number of samples in each of the color planes in the Bayer color format may be less than the number of photodetectors in the image sensor of the camera.

For instance, if there are 10 mega-photodetectors to generate a 10 megapixel image or output of image sensor is 10 megapixel image content, then the green color plane may include 5 mega green values, the red color plane may include 2.5 mega red values, and the blue color plane may include 2.5 mega blue values. In this example, the full resolution is 10 mega sample values (e.g., because there are 10 mega-photodetectors or the image content output from the image sensor is 10 megapixel), and each of the color planes includes fewer samples (e.g., is at a reduced resolution relative to a full resolution). That is, in the Bayer color format, the plurality of color planes at the reduced resolution includes a green color plane at half-resolution relative to the full resolution (e.g., 5 mega green values relative to 10 megapixels), a red color plane at quarter-resolution relative to the full resolution (e.g., 2.5 mega red values relative to 10 megapixels), and a blue color plane at quarter-resolution relative to the full resolution (e.g., 2.5 mega blue values relative to 10 megapixels).

A camera processor receives the image data in the Bayer color format, and performs a demosaic operation to transform the Bayer color format into a RGB color format. In the RGB (red-green-blue) color format, each of the color planes are of the same resolution (e.g., green, red, and blue color planes are all at full resolution). There may be various ways to perform demosaicing. As one example, the camera processors may interpolate the green values in the green color plane to generate green values for a full resolution green color plane, interpolate the red values in the red color plane to generate red values for a full resolution red color plane, and interpolate the blue values in the blue color plane to generate blue values for a full resolution blue color plane. There may be some additional modifications to such techniques to improve the demosaicing process, such as if there is an abrupt in change in a color value relative to proximate color values, the camera processor may not perform interpolation, and instead select one color value, as abrupt changes in color value may be indicative of an edge.

As another example, the camera processor may interpolate a first color plane at the reduced resolution to generate a first color plane at an increased resolution (e.g., including full resolution). As one example, the camera processor may interpolate the green color plane in the reduced resolution to generate a green color plane at the full resolution. The camera processor may then determine a first difference plane based on a difference between the red color plane in the reduced resolution and the green color plane in the increased resolution, and a second difference plane based on a difference between the blue color plane in the reduced resolution and the green color plane in the increase resolution. The camera processor may then perform interpolation on the first difference plane and the second difference plane to generate a first difference plane in the increased resolution and the second difference plane in the increased resolution. The camera processor may then add the green color plane in the increased resolution to the first difference plane in the increased resolution to generate the red color plane in the increased resolution, and add the green color plane in the increased resolution to the second difference plane in the increased resolution to generate the blue color plane in the increase resolution.

There may be other example techniques of demosaicing. The above are a few non-limiting examples. The result from the demosaicing may be a RGB color plane, where there are three color planes (e.g., red color plane, green color plane, and the blue color plane) that are at the same resolution (e.g., full resolution).

In some conventional techniques, after demosaicing, the camera processor may perform image processing using the RGB color planes at full resolution. For instance, the camera processor may perform warping and scaling. In some conventional techniques, the camera processor may generate the RGB color planes, and then generate color planes in another color format (e.g., YUV) and perform image processing in the YUV color format.

This disclosure describes example techniques of performing image processing in an intermediate color format that is intermediate to the Bayer color format and the RGB color format. For instance, the camera processor may generate image data in an intermediate color format based on the image data in the first color format (e.g., Bayer color format). In the intermediate color format, there is a first color plane at an increased resolution and at least one of the plurality of color planes is at the reduced resolution. For instance, in the intermediate color format, the camera processor may interpolate the green color plane of the Bayer color format to generate a green color plane at an increase resolution (e.g., full resolution). The camera processor may leave the red color plane and the blue color plane in the reduced resolution of the Bayer color format.

In one or more examples, the camera processor may store the image data in the intermediate color format to one or more external memories (e.g., memory external to the integrated circuit (IC) chip that includes the camera processor). The camera processor may then access the image data in the intermediate color format, and perform image processing. The camera processor may then generate image data in the third color format (e.g., RGB color format) subsequent to the image processing.

Performing image processing on the intermediate color format may provide benefits over techniques that require generating the RGB color format. For instance, performing image processing on the RGB color format may require additional memory bandwidth and processing, as compared to performing image processing on the intermediate color format. As described, in the intermediate color format, one color plane is in the increased resolution, while one or more of the other color planes are in the reduced resolution. In the RGB color format, all color planes are in the increased resolution. Therefore, there are more samples in the RGB color format, compared to the intermediate color format.

Accordingly, performing image processing in the RGB color format may require additional memory and processing time as compared to performing image processing the intermediate color format.

Some techniques may perform image processing in the Bayer color format. However, image processing in the Bayer color format may lead to poor image quality, such as in downscaling, because of the lack of sample values (e.g., because the Bayer color format is already in reduced resolution).

As described, some techniques may convert RGB color plane to YUV color plane. In the YUV color plane, there is one full resolution intensity plane (e.g., Y), and two reduced resolution color planes (e.g., U and V). However, the YUV color plane may not function well for tone mapping, such as in high dynamic range (HDR) content. In HDR, there is a high exposure image and a low exposure image that are stacked (e.g., fused) together. The camera processor may be configured to two warp one of the high exposure image or the low exposure image to register the two images together for fusing. In some cases, if the color plane is YUV for each of the high exposure image and the low exposure image, then the fusing of the images results in relatively poor quality.

While fusing for HDR may function well in the RGB color space, fusing for HDR may function well in the intermediate color format as well. That is, both the RGB color format and the intermediate color format may be tone mapping friendly. Therefore, performing the warping in the intermediate color format for HDR may provide similar results as performing the warping in the RGB color format for HDR, but as there are fewer samples in the intermediate color format, there may be a reduction in memory usage and processing time.

In one or more examples, the camera processor may generate the intermediate color format as part of the demosaicing process. For instance, as described above, in one example of the demosaicing process, the camera processor may interpolate the green color plane of the Bayer color format to an increase resolution (e.g., full resolution) green color plane, while keeping the red and blue color planes of the Bayer color format in respective reduced resolution. This color format, where one of the color planes is at the increased resolution (e.g., green color plane at the full resolution), and at least one of the other plurality of color planes is at the reduced resolution (e.g., red and blue color planes at the reduced resolution), is an example of the intermediate color format.

Accordingly, in some examples, this disclosure may leverage the color planes that are already generated as part of the demosaicing to perform image processing. That is, rather than pipelining the demosaicing process, the camera processor may be configured to store the image data in the intermediate color format to one or more external memories for image processing that are generated as part of the demosaicing. In examples in which demosaicing is performed in a different manner, the camera processor may generate the image data in the intermediate color format as described for image processing. That is, even if not part of the demosaicing process, the camera processor may still generate the image data in the intermediate color format.

In the above, the Bayer color format and the RGB color format are provided as examples for ease of understanding. However, the example techniques may be extended to other examples in which image data is in a color format in which color planes are at reduced resolution, from which the camera processor generates the intermediate color format for image processing, and then generates image data in a color format in which color planes are at same resolution (e.g., full resolution). For example, the camera processor may be configured to receive first image data in a first color format (e.g., Bayer color format) that includes a plurality of color planes at a reduced resolution relative to a full resolution.

The full resolution may be equal to a resolution of image content output from the image sensor. As one example, a full resolution may be equal to a size of the grid of photodetectors in an image sensor of the camera. As another example, such as where binning is used, the full resolution may be the size of the grid of photodetectors in the image sensor divided by an integer because the image sensor may perform averaging before outputting the image content.

The camera processor may be configured to generate second image data in an intermediate color format based on the first image data in the first color format. The intermediate color format includes a first color plane at an increased resolution (e.g., green color plane at full resolution) and at least one of the plurality of color planes at the reduced resolution (e.g., red and blue color planes are in the reduced resolution of the Bayer color format).

The camera processor may store, in the one or more external memories, the second image data. Subsequently, the camera processor may perform image processing based on accessing the second image data from the one or more external memories. The camera processor may generate third image data based on the image processing. The third image data is in a third color format (e.g., RGB color format) that includes the plurality of color planes at a same resolution (e.g., at full resolution).

FIG. 1 is a block diagram of a device configured to perform operations in an intermediate color format according to the techniques of this disclosure. Examples of processing device 100 include processing systems in an automobile (e.g., an advance driver assistance system (ADAS)), processing systems in a robotics application, AR headsets, virtual reality (VR) headsets, stand-alone digital cameras or digital video camcorders, camera-equipped wireless communication device handsets, such as mobile telephones having one or more cameras, cellular or satellite radio telephones, camera-equipped personal digital assistants (PDAs), computing panels or tablets, gaming devices, computer devices that include cameras, such as so-called "webcams," or any device with digital imaging or video capabilities.

As illustrated in the example of FIG. 1, processing device 100 includes camera 102 (e.g., having a lens, a filter, and an image sensor), camera processor 104 and local memory 120 of camera processor 104, a central processing unit (CPU) 106, a graphical processing unit (GPU) 108, user interface 122, memory controller 124 that provides access to system memory 130, and display interface 126 that outputs signals that cause graphical data to be displayed on display 128. Although the example of FIG. 1 illustrates processing device 100 including one camera 102, in some examples, processing device 100 may include a plurality of cameras 102, such as for omnidirectional image or video capture. Also, although processing device 100 is illustrated as including one camera processor 104, in some examples, there may be a plurality of camera processors (e.g., one for each of cameras 102) or one camera processor for each of one or more cameras 102.

Also, although the various components are illustrated as separate components, in some examples the components may be combined to form a system on chip (SoC). As an example, camera processor 104, CPU 106, GPU 108, and display interface 126 may be formed on a common integrated circuit (IC) chip. In some examples, one or more of camera processor 104, CPU 106, GPU 108, and display interface 126 may be in separate IC chips. Additional examples of components that may be configured to perform the example techniques include a digital signal processor (DSP). Various other permutations and combinations are possible, and the techniques should not be considered limited to the example illustrated in FIG. 1.

The various components illustrated in FIG. 1 (whether formed on one device or different devices) may be formed as at least one of fixed-function or programmable circuitry such as in one or more microprocessors, application specific integrated circuits (ASICs), field programmable gate arrays (FPGAs), digital signal processors (DSPs), or other equivalent integrated or discrete logic circuitry. Examples of local memory 120 and system memory 130 include one or more volatile or non-volatile memories or storage devices, such as random access memory (RAM), static RAM (SRAM), dynamic RAM (DRAM), erasable programmable ROM (EPROM), electrically erasable programmable ROM (EEPROM), flash memory, a magnetic data media or an optical storage media.

The various units illustrated in FIG. 1 communicate with each other using bus 132. Bus 132 may be any of a variety of bus structures, such as a third generation bus (e.g., a HyperTransport bus or an InfiniBand bus), a second generation bus (e.g., an Advanced Graphics Port bus, a Peripheral Component Interconnect (PCI) Express bus, or an Advanced extensible Interface (AXI) bus) or another type of bus or device interconnect. The specific configuration of buses and communication interfaces between the different components shown in FIG. 1 is merely exemplary, and other configurations of camera devices and/or other image processing systems with the same or different components may be used to implement the techniques of this disclosure.

Camera processor 104 is configured to receive image frames from camera 102, and process the image frames to generate output frames for display. CPU 106, GPU 108, camera processor 104, or some other circuitry may be configured to process the output frame that includes image content generated by camera processor 104 into images for display on display 128. In some examples, GPU 108 may be further configured to render graphics content on display 128.

In some examples, camera processor 104 may be configured as an image processing pipeline. For instance, camera processor 104 may include a camera interface that interfaces between camera 102 and camera processor 104. Camera processor 104 may include additional circuitry to process the image content. Camera processor 104 outputs the resulting frames with image content (e.g., pixel values for each of the image pixels) to system memory 130 via memory controller 124.

CPU 106 may comprise a general-purpose or a special-purpose processor that controls operation of processing device 100. A user may provide input to processing device 100 to cause CPU 106 to execute one or more software applications. The software applications that execute on CPU 106 may include, for example, a media player application, a video game application, a graphical user interface application or another program. The user may provide input to processing device 100 via one or more input devices (not shown) such as a keyboard, a mouse, a microphone, a touch pad or another input device that is coupled to processing device 100 via user interface 122.

Memory controller 124 facilitates the transfer of data going into and out of system memory 130. For example, memory controller 124 may receive memory read and write commands, and service such commands with respect to memory 130 in order to provide memory services for the components in processing device 100. Memory controller 124 is communicatively coupled to system memory 130. Although memory controller 124 is illustrated in the example of processing device 100 of FIG. 1 as being a processing circuit that is separate from both CPU 106 and system memory 130, in other examples, some or all of the functionality of memory controller 124 may be implemented on one or both of CPU 106 and system memory 130.

System memory 130 may store program modules and/or instructions and/or data that are accessible by camera processor 104, CPU 106, and GPU 108. For example, system memory 130 may store user applications, resulting frames from camera processor 104, etc. System memory 130 may additionally store information for use by and/or generated by other components of processing device 100. For example, system memory 130 may act as a device memory for camera processor 104.

In one or more examples, camera 102 includes a filter (e.g., Bayer filter) and an image sensor that includes a plurality of photodetectors arranged in a grid. The filter passes through a particular color component to each of the photodetectors. For purposes of illustration only, the filter is described as a Bayer filter, but other filters are possible. For instance, the Bayer filter includes a repeating 2×2 grid, where a 2×2 grid includes two green filters (e.g., to pass through the green color from light received at camera 102), one red filter (e.g., to pass through the red color from light received at camera 102), and one blue filter (e.g., to pass through the blue color from light received at camera 102).

Due to the filtering, the output of camera 102 may be first image data in a first color format that includes a plurality of color planes at a reduced resolution relative to a full resolution. The full resolution may be equal to a resolution of image content output from the image sensor of camera 102. As one example, a full resolution may be equal to a size of a grid of photodetectors in the image sensor of camera 102. As another example, camera 102 may be configured to perform binning, in which camera 102 blends output from different photodetectors. In such examples, the full resolution may be the result of the blending. Where blending is not performed by camera 102 or blending is performed further downstream, the full resolution may be the same as the size of the grid of photodetectors. For example, in the example of a Bayer filter, the first color format may be a Bayer color format. The first image data may include a first color plane (e.g., a green color plane), a second color plane (e.g., a red color plane), and a third color plane (e.g., a blue color plane).

Each color plane includes sample values for samples of the associated color. Each color plane may be considered to be in a reduced resolution because the number of samples in the color plane is less than the number of samples in the resolution of image content output from the image sensor. As one example, each color plane may be considered to be in a reduced resolution because the number of samples in the color plane is less than the number of photodetectors, where a full resolution image includes samples (e.g., pixels) equal to the number of photodetectors. For instance, for Bayer filtering, the green color plane includes 50% of the samples compared to full resolution (e.g., half-resolution). This is because in every 2×2 grid of the Bayer filter, there are two green samples. The red color plane includes 25% of the samples compared to full resolution (e.g., quarter resolution), and the blue color plane includes 25% of the samples compared to full resolution (e.g., quarter resolution). This is because in every 2×2 grid of the Bayer filter, there is one red sample and one blue sample.

Camera processor 104 may receive first image data in a first color format that includes a plurality of color planes at a reduced resolution relative to a full resolution (e.g., the resolution of image content output from the image sensor). For example, the first color format is a Bayer color format, and, in the Bayer color format, the plurality of color planes at the reduced resolution includes a green color plane at half-resolution relative to the full resolution, a red color plane at quarter-resolution relative to the full resolution, and a blue color plane at quarter-resolution relative to the full resolution. Again, the Bayer filter is used as an example, and other filtering techniques are possible.

In one or more examples, camera processor 104 may generate second image data in an intermediate color format based on the first image data in the first color format. The intermediate color format includes a first color plane at an increased resolution relative to the reduced resolution and at least one of the plurality of color planes at the reduced resolution. As one example, camera processor 104 may interpolate the sample values in the green color plane to generate a green color plane at an increased resolution. The interpolation may be based on averaging, weighted averaging, etc. of neighboring samples. In some examples, if there is an abrupt change in sample values, camera processor 104 may not perform averaging, and may perform some other interpolation technique (e.g., copying values) because an abrupt change may be indicative of an edge in the image content.

The increased resolution may be a full resolution, but the techniques do not require full resolution, and any resolution greater than the reduced resolution is possible. Also, the green color plane is one example of the color plane whose values are interpolated to a generate a color plane at an increase resolution. Other color planes (e.g., red or blue) may be utilized instead of green. However, since green color plane is at half-resolution, and the red and blue color planes are at quarter-resolution, the green color plane may be a suitable option for increasing resolution since the green color plane is already at a higher resolution relative to the red and blue color planes.

In accordance with one or more examples described in this disclosure, camera processor 104 may perform image processing techniques on the second image data in the intermediate color format. For example, camera processor 104 may perform warping and/or scaling on the second image data, which are examples of image processing, but camera processor 104 may perform other example image processing techniques in addition to or instead of warping and/or scaling on the second image data in the intermediate color format, where the intermediate color format includes a first color plane at an increased resolution and at least one of the plurality of color planes at the reduced resolution.

There may be benefits in performing image processing in the intermediate color format. For instance, performing image processing in the intermediate color format may require processing of fewer samples as compared to some other techniques, resulting in better memory usage and reduced processing time. Also, performing image processing in the intermediate color format preserves color information useful for tone mapping.

For example, in some techniques, camera processor 104 may generate image data in a third color format that includes the plurality of color planes at a same resolution. For instance, camera processor 104 may transform the image data in the Bayer color format to image data in the RGB color format. In the RGB color format, there are three color planes (e.g., red, green, and blue color planes), and the resolution of each of the color planes is the same. For example, the three color planes may be at full resolution.

Performing image processing in the RGB color format tends to produce high quality images, as well as function well for generating high dynamic range (HDR) content. In the RGB color format, if each color plane is full resolution, the number of samples to process is equal to the number of samples in three full resolution color planes. However, in the intermediate color format, one of the color planes is at an increased resolution (e.g., full resolution), and the other color planes are at the reduced resolution (e.g., quarter resolution). Therefore, in the intermediate color format, the number of samples to process is equal to the 1.5 times the number of samples of one full resolution color plane. In some examples, performing image processing, such as downscaling, with image data in the intermediate color format provides the same or substantially the same image quality (e.g., so that not perceivable by a viewer) as downscaling image data in the RGB color format. Accordingly, performing downscaling in the intermediate color format provides memory and processing gains.

It may be possible to achieve memory and processing gains by performing downscaling on the Bayer color format. However, the image quality tends to be poor when scaling is performing using the Bayer color format.

Furthermore, in HDR content, there are two images: first image with low exposure and second image with high exposure. For instance, in photography or videography, multi-exposure HDR capture generates HDR images. Camera 102 may be configured to take images at multiple exposures (e.g., multiple exposure levels), and camera processor 104 may be configured to combine (e.g., stack or fuse) the images at the different exposures. Exposure, as used in this disclosure, refers to the amount of light per unit area that is received over a period of time set by the shutter speed of camera 102. Fast shutter speed may result in low exposure images, and slow shutter speed may result in high exposure images.

In some techniques, camera processor 104 receives image data in the YUV color format. In the YUV color format, there is a full resolution of luminance values (Y), and two chrominance components (U and V) at quarter resolution. While the resolution of the YUV color format is comparable, including being the same, as the intermediate color format, the YUV color format does not work well for HDR content. That is, the combining of image content in the YUV color format results in poor image quality. However, performing operations for HDR content in the intermediate color format may result in higher quality, as compared to YUV, because the intermediate color format includes green, red, and blue sample values that are not available from YUV without additional transforms.

In accordance with one or more example techniques, camera processor 104 may store, in one or more external memories (e.g., system memory 130) the second image data. This is because camera processor 104 may perform image processing on the second image data in the intermediate color format, as described above.

In one or more examples, camera processor 104 may be configured to generate the second image data in the intermediate color format as part of the demosaicing process. As described above, the demosaicing process includes transforming the Bayer color format to the RGB color format. In some demosaicing processes, camera processor 104 performs interpolation on each of the three reduced resolution color planes to generate three full resolution color planes. However, in some other examples, camera processor 104 generates the intermediate color format, and then in a pipeline manner (e.g., without storing to system memory 130), transforms from the intermediate color format to the RGB color format. For example, camera processor 104 generates (e.g., via interpolation) a full resolution green plane. Camera processor 104 determines a first difference plane based on a difference between the red plane at reduced resolution and the green plane at the full resolution, and a second difference plane based on a difference between the blue plane at reduced resolution and the green plane at the full resolution. Camera processor 104 then performs interpolation on the first and second difference planes to generate full resolution planes, and then adds the green plane at the full resolution to generate the red plane at full resolution and the blue plane at full resolution.

Accordingly, in examples where generating the intermediate color format is part of the demosaicing process, camera processor 104 may leverage that the intermediate color format is already generated, and store the image data in the intermediate color format to system memory 103 (e.g., instead of or in addition to keeping the image data in the intermediate color format in local memory 120). In examples where generating the intermediate color format is not part of the demosaicing process, camera processor 104 may generate the intermediate color format separate from the demosaicing process.

When it is time to process the image data in the intermediate color format, camera processor 104 retrieves the image data in the intermediate color format and performs image processing like warping or scaling. That is, camera processor 104 performs image processing based on accessing the second image data that is in the intermediate color format from the one or more external memories (e.g., system memory 130).

Camera processor 104 may be configured to generate third image data based on the image processing. The third image data may be in a third color format that includes the plurality of color planes at a same resolution. For instance, after the image processing, camera processor 104 may utilize the processed image planes, and then interpolate any missing samples (e.g., including techniques similar to generating difference planes). The result may be the third image data in a third color format (e.g., RGB color format) that includes the plurality of color planes (e.g., red, green, and blue color planes) at a same resolution (e.g., each is at full resolution).

Figure 2:
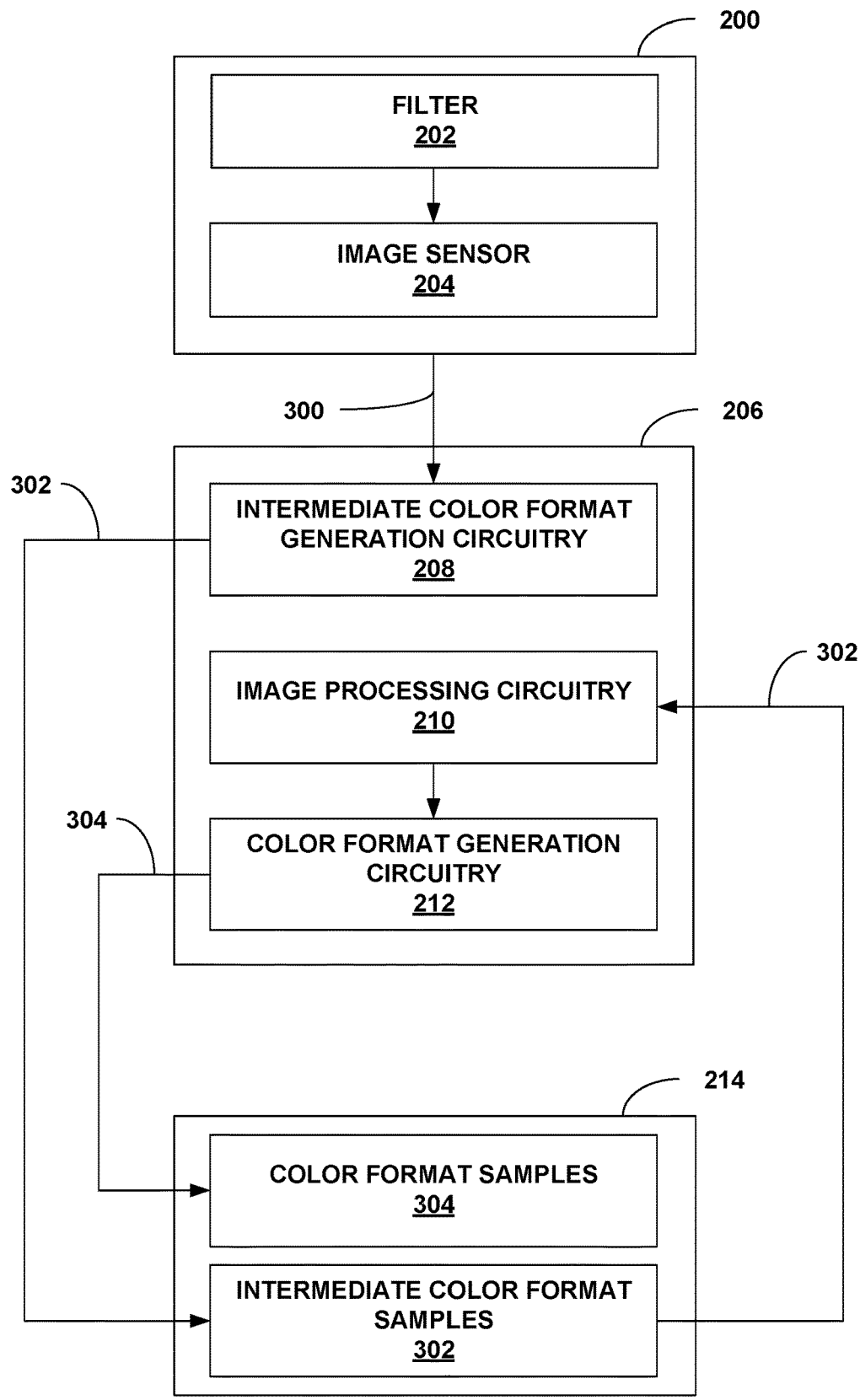
FIG. 2 is a block diagram illustrating a camera, a camera processor, and a memory of FIG. 1 in further detail.

FIG. 2 is a block diagram illustrating a camera, a camera processor, and a memory of FIG. 1 in further detail. FIG. 3 is a conceptual diagram illustrating examples of samples in different formats as generated by the camera and the camera processor according to the techniques of this disclosure. For ease of description, the example of FIG. 2 is described with the example of FIG. 3.

FIG. 2 illustrates camera 200, which is similar to camera 102 of FIG. 1. For instance, camera 200 includes filter 202 (e.g., Bayer filter) and image sensor 204. Image sensor 204 includes a plurality of photodetectors (e.g., a grid of photodetectors). Since filter 202 allows one color component of the light received at camera 200 to pass to image sensor 204, image sensor 204 may be considered as generating first image data in a first color format that includes a plurality of color planes at a reduced resolution relative to a full resolution (e.g., generate first image data in a Bayer color format). The full resolution may be equal to a resolution of image content output from image sensor 204. As one example, the full resolution may be a equal to a size of a grid of the photodetectors on image sensor 204 of camera 200.

As illustrated, camera processor 206 includes intermediate color format generation circuitry 208, image processing circuitry 210, and color format generation circuitry 212. Circuitry 208, 210, and 212 are illustrated for ease. In one or more example, circuitry 208, 210, and 212 may be fixed-function circuitry and/or programmable circuitry. That is, the example operations of circuitry 208, 210, and 212 described in this disclosure may be performed with fixed-function circuitry and/or may be operations defined by software that execute on programmable circuitry (e.g., circuitry 208, 210, and 212). In examples where circuitry 208, 210, and 212 are programmable circuitry, circuitry 208, 210, and 212 may be combined together, and are represented in FIG. 2 as respective portions that are performed.

Intermediate color format generation circuitry 208 may receive first image data in a first color format that includes a plurality of color planes at a reduced resolution relative to a full resolution. For instance, as illustrated in FIG. 2, camera 200 may output Bayer format samples 300. Bayer format samples 300 are an example of the first image data in the first color format.

An example of Bayer format samples 300 is illustrated in FIG. 3. For instance, assume that full resolution is 6×6 (e.g., thirty-six samples or pixels). As illustrated in FIG. 3, for the green color plane, there is a green sample (labeled "G") for every other sample (e.g., there are eighteen green samples in the green color plane). Therefore, the green color plane is half-resolution. For the blue color plane and the red color plane, there is a blue sample (e.g., labeled "B") and a red sample (e.g., labeled "R") for every fourth sample. Therefore, the blue and red color planes are quarter-resolution. Accordingly, in one or more examples, the first color format is a Bayer color format, but other color formats are possible. In the Bayer color format, the plurality of color planes at the reduced resolution includes a green color plane at half-resolution relative to the full resolution, a red color plane at quarter-resolution relative to the full resolution, and a blue color plane at quarter-resolution relative to the full resolution.

Intermediate color format generation circuitry 208 may generate second image data in an intermediate color format based on the first image data in the first color format. The intermediate color format includes a first color plane at an increased resolution relative to the reduced resolution and at least one of the plurality of color planes at the reduced resolution. For instance, as illustrated in FIG. 2, intermediate color format generation circuitry 208 may output intermediate color format samples 302, which are illustrated in FIG. 3. Intermediate color format samples 302 are an example of the second image data in the intermediate color format.

In one or more examples, the first color plane is a green color plane at the increased resolution, but the example techniques are not so limited. For example, to generate the second image data (e.g., at the intermediate color format), intermediate color format generation circuitry 208 may be configured to interpolate samples in a first color plane of the plurality of color planes at the reduced resolution (e.g., green samples at the half-resolution in the Bayer color format) to generate the first color plane at the full resolution (e.g., green samples at increased resolution including full resolution).

For example, as shown in FIG. 3, intermediate color format samples 302 include a 6×6 plane of green samples. Intermediate color format generation circuitry 208 may have interpolated the green samples in the half-resolution color plane of Bayer format samples 300 to generate the additional samples to increase the resolution to full resolution. As illustrated in FIG. 3, the green samples form a full resolution of 6×6 samples. In intermediate color format samples 302, intermediate color format generation circuitry 208 may not perform operations on the blue and red planes of Bayer format samples 300. Therefore, in intermediate color format samples 302, the blue and red planes are the same as the blue and red planes of Bayer format samples 300. As described above, in some examples, intermediate color format generation circuitry 208 may generate intermediate color format samples 302 as part of a demosaic operation to transform the first color format (e.g., Bayer color format) to a third color format (e.g., RGB color format).

As illustrated in FIG. 2, intermediate color format generation circuitry 208 may store, in the one or more external memories 214 (e.g., external to the one or more processors that include camera processor 206), the second image data in the intermediate color format. In FIG. 2, memory 214, which may be external to the integrated circuit (IC) chip that includes camera processor 206, stores intermediate color format samples 302. For instance, one or more external memories 214 are an example of system memory 130 of FIG. 1.

In the example of FIG. 2, image processing circuitry 210 may perform image processing based on accessing the second image data from the one or more external memories 214. For instance, image processing circuitry 210 may access the second image data (e.g., intermediate color format samples 302) from one or more external memories 214. Image processing circuitry 210 may perform image processing such as scaling or warping on intermediate color format samples 302.

Scaling refers to the process of changing the size of an image. For instance, for scaling, image processing circuitry 210 may resize the color planes while maintaining the aspect ratio or changing the aspect ratio between the color planes. Scaling can be performed both in a uniform manner, where the image dimensions are scaled proportionally, or non-uniformly, where the scaling factors for width and height can be different. In general, scaling the color planes down (e.g., downscaling) results in a decrease in the number of samples. Scaling the color planes up (e.g., upsampling) results in an increase in the number of samples. Examples of scaling algorithms include nearest-neighbor interpolation, bilinear interpolation, bicubic interpolation, and more advanced methods like Lanczos or Spline interpolation.

Warping refers to the transformation of an image such that its shape or appearance is altered. Warping may include changing a spatial arrangement of the samples in the color planes to achieve a desired effect. Geometric warping includes manipulating the spatial coordinates of the samples in the intermediate color format samples 302. Image processing circuitry 210 may perform such warping using techniques like affine transformations or perspective transformations.

Affine transformations involve scaling, rotating, translating, and shearing the image. Affine transformations tend to preserve parallel lines and the overall shape of objects but allow for changes in size and orientation. Affine warping is often used for tasks like image registration, where multiple images need to be aligned. Perspective transformations may include more complex warping effects. Perspective transformations involve the modification of the image perspective to simulate the distortion that occurs when viewing a scene from a different viewpoint.

In one or more examples, image processing circuitry 210 may be configured to perform warping as part of generating HDR content. For instance, the first image data (e.g., Bayer format samples 300) is generated with one of a low exposure capture or a high exposure capture for HDR content for a first image frame. To perform the warping, image processing circuitry 210 may be configured to perform the warping on the second image data for registering the first image frame with a second image frame generated with the other of the low exposure capture or the high exposure capture.

In some examples, to perform the image processing, image processing circuitry 210 may be configured to generate a warped or scaled first color plane at the full resolution, a warped or scaled second plane at the reduced resolution, and a warped or scaled third plan at the reduced resolution. For example, image processing circuitry 210 may receive intermediate color format samples 302 that includes a first color plane at the full resolution (e.g., green color plane), a second color plane at the reduced resolution (e.g., red color plane), and a third color plane at the reduced resolution (e.g., blue color plane). Image processing circuitry 210 may be configured to perform warping and/or scaling on the first color plane at the full resolution (e.g., green color plane) to generate a warped or scaled first color plane at the full resolution (e.g., warped or scaled green color plane at full resolution). Image processing circuitry 210 may be configured to perform warping and/or scaling on the second color plane (e.g., red color plane) at the reduced resolution to generate a warped or scaled second color plane at the reduced resolution (e.g., warped or scaled red color plane at reduced resolution). Image processing circuitry 210 may be configured to perform warping and/or scaling on the third color plane (e.g., blue color plane) at the reduced resolution to generate a warped or scaled third color plane at the reduced resolution (e.g., warped or scaled blue color plane at reduced resolution).

In the example of FIG. 2, color format generation circuitry 212 receives the results from the image processing performed with image processing circuitry 210. Color format generation circuitry 212 may be configured to generate third image data based on the image processing. The third image data may be in a third color format that includes the plurality of color planes at a same resolution. For instance, color format samples 304 are an example of the third image data in the third color format. As illustrated in FIG. 3, color format samples 304 includes the plurality of color planes at the same resolution (e.g., the resolution of the green color plane, red color plane, and the blue color plane is the same, such as at full resolution). For example, the third color format is a red-green-blue (RGB) color format, and the intermediate color format is intermediate to the Bayer color format and the RGB color format. As illustrated in FIG. 2, color format generation circuitry 212 may store color format samples 304 in one or more external memories 214.

In some examples, to generate the third image data, color format generation circuitry 212 may interpolate the processed color planes (e.g., red and blue color planes) to generate the color planes for the RGB color format. In some examples, to generate the third image data, color format generation circuitry 212 may be configured to generate a first difference plane based on a difference between the warped or scaled second plane and the warped or scaled first color plane, generate a second difference plane based on a difference between the warped or scaled third plane and the warped or scaled first color plane, interpolate the first difference plane to generate a first interpolated difference plane at the full resolution, interpolate the second difference plane to generate a second interpolated difference plane at the full resolution, add the warped or scaled first color plane to the first difference plane to generate a warped or scaled second color plane at the full resolution, and add the warped or scaled first color plane to the second difference plane to generate a warped or scaled third color plane at the full resolution. In this example, the warped or scaled first color plane at the full resolution, the warped or scaled second color plane at the full resolution, and the warped or scaled third color plane at the full resolution may together form the third image data for the RGB color format.

Therefore, in one or more examples, the first color format is a Bayer color format. As described, in the Bayer color format, the plurality of color planes at the reduced resolution includes a green color plane at half-resolution relative to the full resolution, a red color plane at quarter-resolution relative to the full resolution, and a blue color plane at quarter-resolution relative to the full resolution. To generate the second image data in the intermediate color format, color format generation circuitry 212 may be configured to interpolate samples in the green color plane at the half-resolution relative to the full resolution to generate a first green color plane at the full resolution. In this example, the first color plane at the increased resolution is the first green color plane at the full resolution, As described, in some examples, the third color format is a red-green-blue (RGB) color format. To generate the third image data, color format generation circuitry 212 may be configured to generate a second green color plane at the full resolution, a red color plane at the full resolution, and a blue color plane at the full resolution based on the image processing. That is, after the processing, color format generation circuitry 212 may receive the processed color planes, and then generate RGB color planes from the processed color planes, where the RGB color planes are all of the same resolution (e.g., full resolution).

Figure 4:
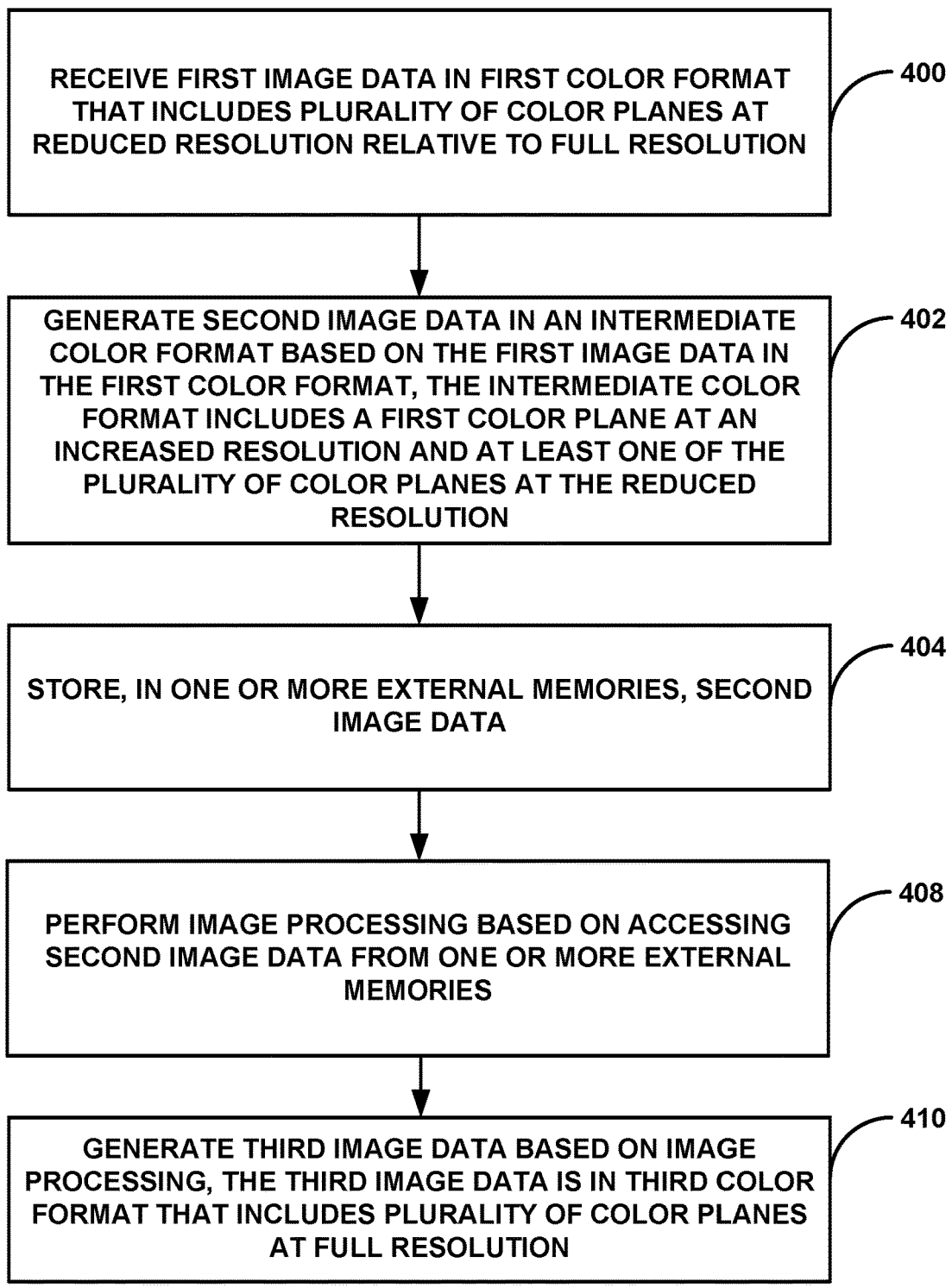
FIG. 4 is a flowchart showing an example method of operation according to the techniques of this disclosure.

FIG. 4 is a flowchart showing an example method of operation according to the techniques of this disclosure. For ease, the example is described with respect to FIGS. 2 and 3.

Intermediate color format generation circuitry 208 may receive first image data in a first color format that includes a plurality of color planes at a reduced resolution relative to a full resolution (400). The full resolution may be equal to a resolution of image content output from image sensor 204 of camera 200. As one example, the full resolution is equal to a size of a grid of photodetectors in image sensor 204 of camera 200. As another example, such as where binning is used, the full resolution is equal to a size of a grid of photodetectors in image sensor 204 of camera 200 divided by an integer.

The first color format may be the Bayer color format. One example of the first image data in the first color format is Bayer format samples 300. In the Bayer color format, the plurality of color planes at the reduced resolution includes a green color plane at half-resolution relative to the full resolution, a red color plane at quarter-resolution relative to the full resolution, and a blue color plane at quarter-resolution relative to the full resolution.

Intermediate color format generation circuitry 208 may generate second image data in an intermediate color format based on the first image data in the first color format, the intermediate color format includes a first color plane at an increased resolution relative to the reduced resolution and at least one of the plurality of color planes at the reduced resolution (402). For example, the first color plane is a green color plane at the increased resolution, and in some examples, the increased resolution is the full resolution. One example of the second image data in the intermediate color format is intermediate color format samples 302.

In some examples, to generate the second image data, intermediate color format generation circuitry 208 may be configured to generate the second image data as part of a demosaic operation to transform the first color format to the third color format (e.g., RGB color format). In some examples, to generate the second image data, intermediate color format generation circuitry 208 may be configured to interpolate samples in a first color plane of the plurality of color planes at the reduced resolution to generate the first color plane at the full resolution (e.g., interpolate the green plane at the half-resolution to generate the green plane at the full resolution).

Intermediate color format generation circuitry 208 may store, in one or more external memories 214 external to the one or more processors, the second image data that is at the intermediate color format (404). Image processing circuitry 210 may be configured perform image processing based on accessing the second image data from the one or more external memories 214 (406).

In some examples, to perform the image processing, image processing circuitry 210 may be configured to perform warping or scaling on the second image data. For example, the first image data (e.g., Bayer format samples 300) may be generated with one of a low exposure capture or a high exposure capture for high dynamic range (HDR) content for a first image frame. To perform warping, image processing circuitry 210 may be configured to perform the warping on the second image data (e.g., intermediate color format samples 302) for registering the first image frame with a second image frame generated with the other of the low exposure capture or the high exposure capture.

Color format generation circuitry 212 may be configured to generate third image data based on the image processing, the third image data is in a third color format that includes the plurality of color planes at a same resolution (410). One example of the third image data is color format samples 304. As one example, the third image data in the third color format that includes the plurality of color planes at the same resolution may be the third image data in the third color format that includes the plurality of color planes at the full resolution (e.g., the green, red, and blue color planes are each as the full resolution). In some examples, the third color forma is a red-green-blue (RGB) color format, and the intermediate color format is intermediate to the Bayer color format and the RGB color format.

The following table illustrates some example results based on the techniques described in this disclosure.

TABLE 1

| | Processing Behavior | | |
|---|---|---|---|
| | Tone mapping friendly | Image Quality after downscale | # of Planes |
| YUV 420 | No | Good | 1.5 |
| RGB | Yes | Good | 3 |
| Bayer | Yes | Worse | 1 |
| Intermediate Color Format | Yes | Good | 1.5 |

As can be seen from Table 1, by performing the example techniques in the intermediate color format (e.g., a first color plane at an increased resolution and at least one of the plurality of color planes at the reduced resolution), the example techniques provide for friendly tone mapping, which may be useful for HDR content, good image quality after downscale, while keeping the number of planes to 1.5. Hence, performing the example techniques using the intermediate color format provides for reduced memory usage and processing time, while providing good image quality and functioning well for HDR content.

The following describes other example aspects of the disclosure. The techniques of the following aspects may be used separately or in any combination.

Clause 1. An apparatus for image processing, the apparatus comprising: one or more external memories external to an integrated circuit (IC) chip that includes one or more processors; and the one or more processors implemented in circuitry, coupled to the one or more external memories, and configured to: receive first image data in a first color format that includes a plurality of color planes at a reduced resolution relative to a full resolution, the full resolution being equal to a resolution of image content output from an image sensor of a camera; generate second image data in an intermediate color format based on the first image data in the first color format, the intermediate color format includes a first color plane at an increased resolution relative to the reduced resolution and at least one of the plurality of color planes at the reduced resolution; store, in the one or more external memories external to the one or more processors, the second image data; perform image processing based on accessing the second image data from the one or more external memories; and generate third image data based on the image processing, the third image data is in a third color format that includes the plurality of color planes at a same resolution.

Clause 2. The apparatus of clause 1, wherein the increased resolution is the full resolution.

Clause 3. The apparatus of any of clauses 1 and 2, wherein the third image data in the third color format that includes the plurality of color planes at the same resolution comprises the third image data in the third color format that includes the plurality of color planes at the full resolution.

Clause 4. The apparatus of any of clauses 1-3, wherein to perform the image processing, the one or more processors are configured to perform warping or scaling on the second image data.

Clause 5. The apparatus of clause 4, wherein the first image data is generated with one of a low exposure capture or a high exposure capture for high dynamic range (HDR) content for a first image frame, wherein to perform the warping, the one or more processors are configured to perform the warping on the second image data for registering the first image frame with a second image frame generated with the other of the low exposure capture or the high exposure capture.

Clause 6. The apparatus of any of clauses 1-5, wherein the first color plane is a green color plane at the increased resolution.

Clause 7. The apparatus of any of clauses 1-6, wherein the first color format is a Bayer color format, wherein, in the Bayer color format, the plurality of color planes at the reduced resolution includes a green color plane at half-resolution relative to the full resolution, a red color plane at quarter-resolution relative to the full resolution, and a blue color plane at quarter-resolution relative to the full resolution.

Clause 8. The apparatus of clause 7, wherein the third color format is a red-green-blue (RGB) color format, and wherein the intermediate color format is intermediate to the Bayer color format and the RGB color format.

Clause 9. The apparatus of any of clauses 1-8, wherein to generate the second image data, the one or more processors are configured to generate the second image data as part of a demosaic operation to transform the first color format to the third color format.

Clause 10. The apparatus of any of clauses 1-9, wherein to generate the second image data, the one or more processors are configured to interpolate samples in a first color plane of the plurality of color planes at the reduced resolution to generate the first color plane at the full resolution.

Clause 11. The apparatus of any of clauses 1-10, wherein the resolution of image content output from the image sensor of the camera is one of a size of a grid of photodetectors in the image sensor or the size of the grid of photodetectors divided with an integer.

Clause 12. The apparatus of any of clauses 1-11, wherein the first color format is a Bayer color format, wherein, in the Bayer color format, the plurality of color planes at the reduced resolution includes a green color plane at half-resolution relative to the full resolution, a red color plane at quarter-resolution relative to the full resolution, and a blue color plane at quarter-resolution relative to the full resolution, wherein to generate the second image data in the intermediate color format, the one or more processors are configured to interpolate samples in the green color plane at the half-resolution relative to the full resolution to generate a first green color plane at the full resolution, wherein the first color plane at the increased resolution is the first green color plane at the full resolution, wherein the third color format is a red-green-blue (RGB) color format, and wherein to generate the third image data, the one or more processors are configured to generate a second green color plane at the full resolution, a red color plane at the full resolution, and a blue color plane at the full resolution based on the image processing.

Clause 13. A method of image processing, the method comprising: receiving, with one or more processors, first image data in a first color format that includes a plurality of color planes at a reduced resolution relative to a full resolution, the full resolution being equal to a resolution of image content output from an image sensor of a camera; generating, with the one or more processors, second image data in an intermediate color format based on the first image data in the first color format, the intermediate color format includes a first color plane at an increased resolution relative to the reduced resolution and at least one of the plurality of color planes at the reduced resolution; storing, in one or more external memories external to the one or more processors, the second image data; performing, with the one or more processors, image processing based on accessing the second image data from the one or more external memories; and generating third image data based on the image processing, the third image data is in a third color format that includes the plurality of color planes at a same resolution.

Clause 14. The method of clause 13, wherein the increased resolution is the full resolution.

Clause 15. The method of any of clauses 13 and 14, wherein the third image data in the third color format that includes the plurality of color planes at the same resolution comprises the third image data in the third color format that includes the plurality of color planes at the full resolution.

Clause 16. The method of any of clauses 13-15, wherein performing the image processing comprises performing warping or scaling on the second image data.

Clause 17. The method of clause 16, wherein the first image data is generated with one of a low exposure capture or a high exposure capture for high dynamic range (HDR) content for a first image frame, wherein performing the warping comprises performing the warping on the second image data for registering the first image frame with a second image frame generated with the other of the low exposure capture or the high exposure capture.

Clause 18. The method of any of clauses 13-17, wherein the first color plane is a green color plane at the increased resolution.

Clause 19. The method of any of clauses 13-18, wherein the first color format is a Bayer color format, wherein, in the Bayer color format, the plurality of color planes at the reduced resolution includes a green color plane at half-resolution relative to the full resolution, a red color plane at quarter-resolution relative to the full resolution, and a blue color plane at quarter-resolution relative to the full resolution.

Clause 20. The method of clause 19, wherein the third color format is a red-green-blue (RGB) color format, and wherein the intermediate color format is intermediate to the Bayer color format and the RGB color format.

Clause 21. The method of any of clauses 13-20, wherein generating the second image data comprises generating the second image data as part of a demosaic operation to transform the first color format to the third color format.

Clause 22. The method of any of clauses 13-21, wherein generating the second image data comprises interpolating samples in a first color plane of the plurality of color planes at the reduced resolution to generate the first color plane at the full resolution.

Clause 23. The method of any of clauses 13-22, wherein the resolution of image content output from the image sensor of the camera is one of a size of a grid of photodetectors in the image sensor or the size of the grid of photodetectors divided with an integer.

Clause 24. The method of any of clauses 13-23, wherein the first color format is a Bayer color format, wherein, in the Bayer color format, the plurality of color planes at the reduced resolution includes a green color plane at half-resolution relative to the full resolution, a red color plane at quarter-resolution relative to the full resolution, and a blue color plane at quarter-resolution relative to the full resolution, wherein generating the second image data in the intermediate color format comprises interpolating samples in the green color plane at the half-resolution relative to the full resolution to generate a first green color plane at the full resolution, wherein the first color plane at the increased resolution is the first green color plane at the full resolution, wherein the third color format is a red-green-blue (RGB) color format, and wherein generating the third image data comprises generating a second green color plane at the full resolution, a red color plane at the full resolution, and a blue color plane at the full resolution based on the image processing.

Clause 25. A computer-readable storage medium storing instructions thereon that when executed cause one or more processors to: receive first image data in a first color format that includes a plurality of color planes at a reduced resolution relative to a full resolution, the full resolution being equal to a resolution of image content output from an image sensor of a camera; generate second image data in an intermediate color format based on the first image data in the first color format, the intermediate color format includes a first color plane at an increased resolution relative to the reduced resolution and at least one of the plurality of color planes at the reduced resolution; store, in one or more external memories external to the one or more processors, the second image data; perform image processing based on accessing the second image data from the one or more external memories; and generate third image data based on the image processing, the third image data is in a third color format that includes the plurality of color planes at a same resolution.

Clause 26. The computer-readable storage medium of clause 25, further comprising instructions that cause the one or more processors to perform the method of any of clauses 13-24.

Clause 27. An apparatus for image processing comprising means for performing the method of any of clauses 13-24.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media. In this manner, computer-readable media generally may correspond to tangible computer-readable storage media which is non-transitory. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. It should be understood that computer-readable storage media and data storage media do not include carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. An apparatus for image processing, the apparatus comprising:
   one or more external memories external to an integrated circuit (IC) chip that includes one or more processors; and
   the one or more processors implemented in circuitry, coupled to the one or more external memories, and configured to:
      receive first image data in a first color format that includes a plurality of color planes at a reduced resolution relative to a full resolution, the full resolution being equal to a resolution of image content output from an image sensor of a camera;
      generate second image data in an intermediate color format based on the first image data in the first color format, the intermediate color format includes a first color plane at an increased resolution relative to the reduced resolution and at least one of the plurality of color planes at the reduced resolution;
      store, in the one or more external memories external to the one or more processors, the second image data;
      perform image processing based on accessing the second image data from the one or more external memories; and
      generate third image data based on the image processing, the third image data is in a third color format that includes the plurality of color planes at a same resolution.

2. The apparatus of claim 1, wherein the increased resolution is the full resolution.

3. The apparatus of claim 1, wherein the third image data in the third color format that includes the plurality of color planes at the same resolution comprises the third image data in the third color format that includes the plurality of color planes at the full resolution.

4. The apparatus of claim 1, wherein to perform the image processing, the one or more processors are configured to perform warping or scaling on the second image data.

5. The apparatus of claim 4, wherein the first image data is generated with one of a low exposure capture or a high exposure capture for high dynamic range (HDR) content for a first image frame, wherein to perform the warping, the one or more processors are configured to perform the warping on the second image data for registering the first image frame with a second image frame generated with the other of the low exposure capture or the high exposure capture.

6. The apparatus of claim 1, wherein the first color plane is a green color plane at the increased resolution.

7. The apparatus of claim 1, wherein the first color format is a Bayer color format, and wherein, in the Bayer color format, the plurality of color planes at the reduced resolution includes a green color plane at half-resolution relative to the full resolution, a red color plane at quarter-resolution relative to the full resolution, and a blue color plane at quarter-resolution relative to the full resolution.

8. The apparatus of claim 7, wherein the third color format is a red-green-blue (RGB) color format, and wherein the intermediate color format is intermediate to the Bayer color format and the RGB color format.

9. The apparatus of claim 1, wherein to generate the second image data, the one or more processors are configured to generate the second image data as part of a demosaic operation to transform the first color format to the third color format.

10. The apparatus of claim 1, wherein to generate the second image data, the one or more processors are configured to interpolate samples in a first color plane of the plurality of color planes at the reduced resolution to generate the first color plane at the full resolution.

11. The apparatus of claim 1, wherein the resolution of image content output from the image sensor of the camera is one of a size of a grid of photodetectors in the image sensor or the size of the grid of photodetectors divided with an integer.

12. The apparatus of claim 1,
wherein the first color format is a Bayer color format,
wherein, in the Bayer color format, the plurality of color planes at the reduced resolution includes a green color plane at half-resolution relative to the full resolution, a red color plane at quarter-resolution relative to the full resolution, and a blue color plane at quarter-resolution relative to the full resolution,
wherein to generate the second image data in the intermediate color format, the one or more processors are configured to interpolate samples in the green color plane at the half-resolution relative to the full resolution to generate a first green color plane at the full resolution, wherein the first color plane at the increased resolution is the first green color plane at the full resolution,
wherein the third color format is a red-green-blue (RGB) color format, and
wherein to generate the third image data, the one or more processors are configured to generate a second green color plane at the full resolution, a red color plane at the full resolution, and a blue color plane at the full resolution based on the image processing.

13. A method of image processing, the method comprising:
receiving, with one or more processors, first image data in a first color format that includes a plurality of color planes at a reduced resolution relative to a full resolution, the full resolution being equal to a resolution of image content output from an image sensor of a camera;
generating, with the one or more processors, second image data in an intermediate color format based on the first image data in the first color format, the intermediate color format includes a first color plane at an increased resolution relative to the reduced resolution and at least one of the plurality of color planes at the reduced resolution;
storing, in one or more external memories external to the one or more processors, the second image data;
performing, with the one or more processors, image processing based on accessing the second image data from the one or more external memories; and
generating third image data based on the image processing, the third image data is in a third color format that includes the plurality of color planes at a same resolution.

14. The method of claim 13, wherein the increased resolution is the full resolution.

15. The method of claim 13, wherein the third image data in the third color format that includes the plurality of color planes at the same resolution comprises the third image data in the third color format that includes the plurality of color planes at the full resolution.

16. The method of claim 13, wherein performing the image processing comprises performing warping or scaling on the second image data.

17. The method of claim 16, wherein the first image data is generated with one of a low exposure capture or a high exposure capture for high dynamic range (HDR) content for a first image frame, wherein performing the warping comprises performing the warping on the second image data for registering the first image frame with a second image frame generated with the other of the low exposure capture or the high exposure capture.

18. The method of claim 13, wherein the first color plane is a green color plane at the increased resolution.

19. The method of claim 13, wherein the first color format is a Bayer color format, and wherein, in the Bayer color format, the plurality of color planes at the reduced resolution includes a green color plane at half-resolution relative to the full resolution, a red color plane at quarter-resolution relative to the full resolution, and a blue color plane at quarter-resolution relative to the full resolution.

20. The method of claim 19, wherein the third color format is a red-green-blue (RGB) color format, and wherein the intermediate color format is intermediate to the Bayer color format and the RGB color format.

21. The method of claim 13, wherein generating the second image data comprises generating the second image data as part of a demosaic operation to transform the first color format to the third color format.

22. The method of claim 13, wherein generating the second image data comprises interpolating samples in a first color plane of the plurality of color planes at the reduced resolution to generate the first color plane at the full resolution.

23. The method of claim 13, wherein the resolution of image content output from the image sensor of the camera is one of a size of a grid of photodetectors in the image sensor or the size of the grid of photodetectors divided with an integer.

24. The method of claim 13,
wherein the first color format is a Bayer color format,
wherein, in the Bayer color format, the plurality of color planes at the reduced resolution includes a green color plane at half-resolution relative to the full resolution, a red color plane at quarter-resolution relative to the full resolution, and a blue color plane at quarter-resolution relative to the full resolution,
wherein generating the second image data in the intermediate color format comprises interpolating samples in the green color plane at the half-resolution relative to the full resolution to generate a first green color plane at the full resolution, wherein the first color plane at the increased resolution is the first green color plane at the full resolution,
wherein the third color format is a red-green-blue (RGB) color format, and
wherein generating the third image data comprises generating a second green color plane at the full resolution, a red color plane at the full resolution, and a blue color plane at the full resolution based on the image processing.

25. A non-transitory computer-readable storage medium storing instructions thereon that when executed cause one or more processors to: receive first image data in a first color format that includes a plurality of color planes at a reduced resolution relative to a full resolution, the full resolution being equal to a resolution of image content output from an image sensor of a camera; generate second image data in an intermediate color format based on the first image data in the first color format, the intermediate color format includes a first color plane at an increased resolution relative to the reduced resolution and at least one of the plurality of color planes at the reduced resolution; store, in one or more external memories external to the one or more processors, the second image data; perform image processing based on accessing the second image data from the one or more external memories; and generate third image data based on the image processing, the third image data is in a third color format that includes the plurality of color planes at a same resolution.

* * * * *